US012587800B2

(12) United States Patent
Dunér et al.

(10) Patent No.: US 12,587,800 B2
(45) Date of Patent: Mar. 24, 2026

(54) METHOD AND DEVICE FOR DETERMINING A MICROPHONE STATUS

(71) Applicant: Axis AB, Lund (SE)

(72) Inventors: Henrik Dunér, Lund (SE); Susanne Dunér, Lund (SE)

(73) Assignee: AXIS AB, Lund (SE)

( * ) Notice: Subject to any disclaimer, the term of this patent is extended or adjusted under 35 U.S.C. 154(b) by 219 days.

(21) Appl. No.: 18/442,521

(22) Filed: Feb. 15, 2024

(65) Prior Publication Data

US 2024/0292168 A1 Aug. 29, 2024

(30) Foreign Application Priority Data

Feb. 23, 2023 (EP) .................................... 23158123

(51) Int. Cl.
*H04R 29/00* (2006.01)
*H04R 1/08* (2006.01)

(52) U.S. Cl.
CPC ........... *H04R 29/004* (2013.01); *H04R 1/083* (2013.01)

(58) Field of Classification Search
CPC .............................. H04R 29/004; H04R 1/083
USPC ........................ 381/56, 58, 91, 92, 122, 124
See application file for complete search history.

(56) References Cited

U.S. PATENT DOCUMENTS

| | | | | |
|---|---|---|---|---|
| 10,830,866 | B1 | 11/2020 | Onofrio et al. | |
| 11,775,249 | B2 * | 10/2023 | Nedelcu | H04R 1/04 381/56 |
| 2018/0324530 | A1 * | 11/2018 | Hoskins | H04R 17/02 |
| 2020/0245086 | A1 | 7/2020 | Kim et al. | |
| 2022/0070600 | A1 | 3/2022 | Bhattacharya et al. | |

FOREIGN PATENT DOCUMENTS

| | | | | |
|---|---|---|---|---|
| CN | 213126474 | U | 5/2021 | |
| CN | 216291445 | U | 4/2022 | |
| WO | WO-2017153363 | A1 * | 9/2017 | H04R 3/00 |
| WO | WO-2019133646 | A1 * | 7/2019 | H04R 29/004 |
| WO | WO-2022043652 | A1 * | 3/2022 | H04R 29/004 |

* cited by examiner

*Primary Examiner* — William A Jerez Lora
(74) *Attorney, Agent, or Firm* — Volpe Koenig

(57) ABSTRACT

A method for determining a status of a microphone comprises inducing a piezoelectric component, located in a vicinity of and in mechanical connection with the microphone, to emit a predetermined impulse waveform; determining whether a response signal waveform from the microphone corresponds to the predetermined impulse waveform; and upon the response signal waveform from the microphone corresponding to the predetermined impulse waveform, determining that the status of the microphone is operational.

11 Claims, 4 Drawing Sheets

METHOD AND DEVICE FOR DETERMINING A MICROPHONE STATUS

FIELD OF INVENTION

The present disclosure relates to determining an operational status of a microphone in a device and a device configured to perform such determination.

TECHNICAL BACKGROUND

Electronic devices that are configured to register sound waves and provide electric signals that represent the registered sound waves are necessarily equipped with a microphone and associated analogue and digital circuitry configured to process and transmit these signals. For some types of such devices, it is imperative that the microphone is fully operational and that an operator or user of the device is able to ascertain himself or herself of the operational status. For example, one type of such a device is a device for surveillance. Such a device for surveillance may, e.g., be a surveillance camera. A surveillance camera is typically equipped with a microphone for obtaining audio information associated with video information registered by the surveillance camera as well as obtaining audio information that is not associated with any video information.

SUMMARY

According to a first aspect there is provided a method for determining a status of a microphone. The method comprises transmitting a predetermined impulse waveform to a piezoelectric component, the piezoelectric component being located in a vicinity of the microphone and arranged in mechanical connection with the microphone, to induce a mechanical impulse in the piezoelectric component. A determination is made whether a response signal waveform from the microphone corresponds to the predetermined impulse waveform; and upon the response signal waveform from the microphone corresponding to the predetermined impulse waveform, a determination is made that the status of the microphone is operational. The predetermined impulse waveform may comprise a square waveform.

Thus, by providing a predetermined impulse waveform to a piezoelectric component close to the microphone and in mechanical connection with the microphone, the microphone will receive a mechanical impulse from the piezoelectric component that will result in a relative movement between a membrane within the microphone and an encapsulating part of the microphone. Hence, by triggering the piezoelectric component to emit a mechanical impulse, i.e., to undergo a change in spatial extension according to the received impulse waveform, the microphone will register this as a relative movement between the membrane within the microphone and an encapsulating part of the microphone. As a consequence of this relative movement, the microphone will create a response signal in the same way as if the membrane was displaced relative the encapsulating part by a sound wave, but without any generation of sound that may be an audible disturbance from the point of hearing of an outside observer. Such a method enables an operator to obtain an operational status at any time and with any desired regularity without generating undesirable noise.

The determination whether a response signal waveform from the microphone corresponds to the predetermined impulse waveform may comprise determining that a timing difference between the response signal waveform and the predetermined impulse waveform is within a predetermined timing difference interval. Such a determination is simple. Further it allows for a more or less deteriorated response signal waveform to be used in the determination.

Alternatively, or in combination, the predetermined impulse waveform may comprise an encoded pattern. In such a case, the determination whether a response signal waveform from the microphone corresponds to the predetermined impulse waveform may comprise determining that the response signal waveform comprises the encoded pattern. By utilizing a waveform with an encoded pattern that is more or less complex, a more reliable determination is possible in that spurious signals that may be mistaken for a response from the microphone may be disregarded.

The encoded pattern may be a sequence of a predetermined number of impulses delimited by a respective predetermined time interval.

While registering an audio signal from the microphone and while providing the audio signal to an audio signal receiver, prior to transmitting the predetermined impulse waveform to the piezoelectric component, provision of a temporary replacement audio signal may be initiated, and after the determination whether a response signal waveform from the microphone corresponds to the predetermined impulse waveform, the provision of the audio signal to the audio signal receiver may be resumed.

In other words, by replacing the audio signal, during a time period when the piezoelectric component emits a mechanical impulse, with a replacement audio signal it is possible to prevent a response signal waveform corresponding to the mechanical impulse from reaching the audio signal receiver and thereby prevent the audio signal receiver from generating potentially undesired “clicking” noise. For example, the temporary replacement audio signal may be in the form of a computed extrapolation or interpolation of the audio signal provided to the audio signal receiver prior to the initiation of provision of the temporary replacement audio signal. In another example, the temporary replacement audio signal may be a difference audio signal computed by subtracting a predetermined response signal waveform from the response signal waveform from the microphone.

According to a second aspect, a non-transitory computer-readable storage medium is provided. The non-transitory computer-readable storage medium has stored thereon instructions for implementing the method according to the first aspect when executed on a device having processing capabilities.

According to a third aspect, a device is provided that comprises circuitry, a microphone and a piezoelectric component in a vicinity of and in mechanical connection with each other. The circuitry is connected to the microphone and connected to the piezoelectric component and the circuitry is configured to execute a transmitting function configured to transmit a predetermined impulse waveform to the piezoelectric component to induce a mechanical impulse in the piezoelectric component. The circuitry is further configured to execute a response determining function configured to determine whether a response signal waveform from the microphone corresponds to the predetermined impulse waveform; and configured to, upon the response signal waveform from the microphone corresponding to the predetermined impulse waveform, determine that the status of the microphone is operational. The device may comprise a printed circuit board (PCB) and the microphone and the piezoelectric component may both be attached to the PCB in the vicinity of each other.

As for the method according to the first aspect, such a device is advantageous in that it, i.a., enables an operator to obtain an operational status of the microphone at any time and with any desired regularity without generating undesirable noise.

Furthermore, the piezoelectric component may be any of a multi-layer ceramic capacitor, (MLCC), and a piezoelectric actuator made of lead zirconate titanate (PZT).

An MLCC is advantageous in more than one way. For example, an MLCC is an extremely simple construction and thereby very cheap; it is also very reliable over a long period of time and it is therefore a safe choice when implementing the present functionality in a microphone equipped device that is to be monitored over long time periods.

A further scope of applicability of the present disclosure will become apparent from the detailed description given below. However, it should be understood that the detailed description and specific examples, while indicating preferred embodiments of the disclosure, are given by way of illustration only, since various changes and modifications within the scope of the disclosure will become apparent to those skilled in the art from this detailed description.

Hence, it is to be understood that this disclosure is not limited to the particular component parts of the device described or acts of the methods described as such device and method may vary. It is also to be understood that the terminology used herein is for purpose of describing particular embodiments only, and is not intended to be limiting. It must be noted that, as used in the specification and the appended claims, the articles "a," "an," "the," and "said" are intended to mean that there are one or more of the elements unless the context clearly dictates otherwise. Thus, for example, reference to "a device" or "the device" may include several devices, and the like. Furthermore, the words "comprising", "including", "containing" and similar wordings does not exclude other elements or steps.

BRIEF DESCRIPTION OF THE DRAWINGS

The above and other aspects of the present disclosure will now be described in more detail, with reference to appended figures. The figures should not be considered limiting; instead, they are used for explaining and understanding. Like reference numerals refer to like elements throughout.

DETAILED DESCRIPTION

The present disclosure will now be described more fully hereinafter with reference to the accompanying drawings, in which currently preferred embodiments of the disclosure are shown. This disclosure may, however, be embodied in many different forms and should not be construed as limited to the embodiments set forth herein; rather, these embodiments are provided for thoroughness and completeness, and to fully convey the scope of the disclosure to the skilled person.

Figure 1:
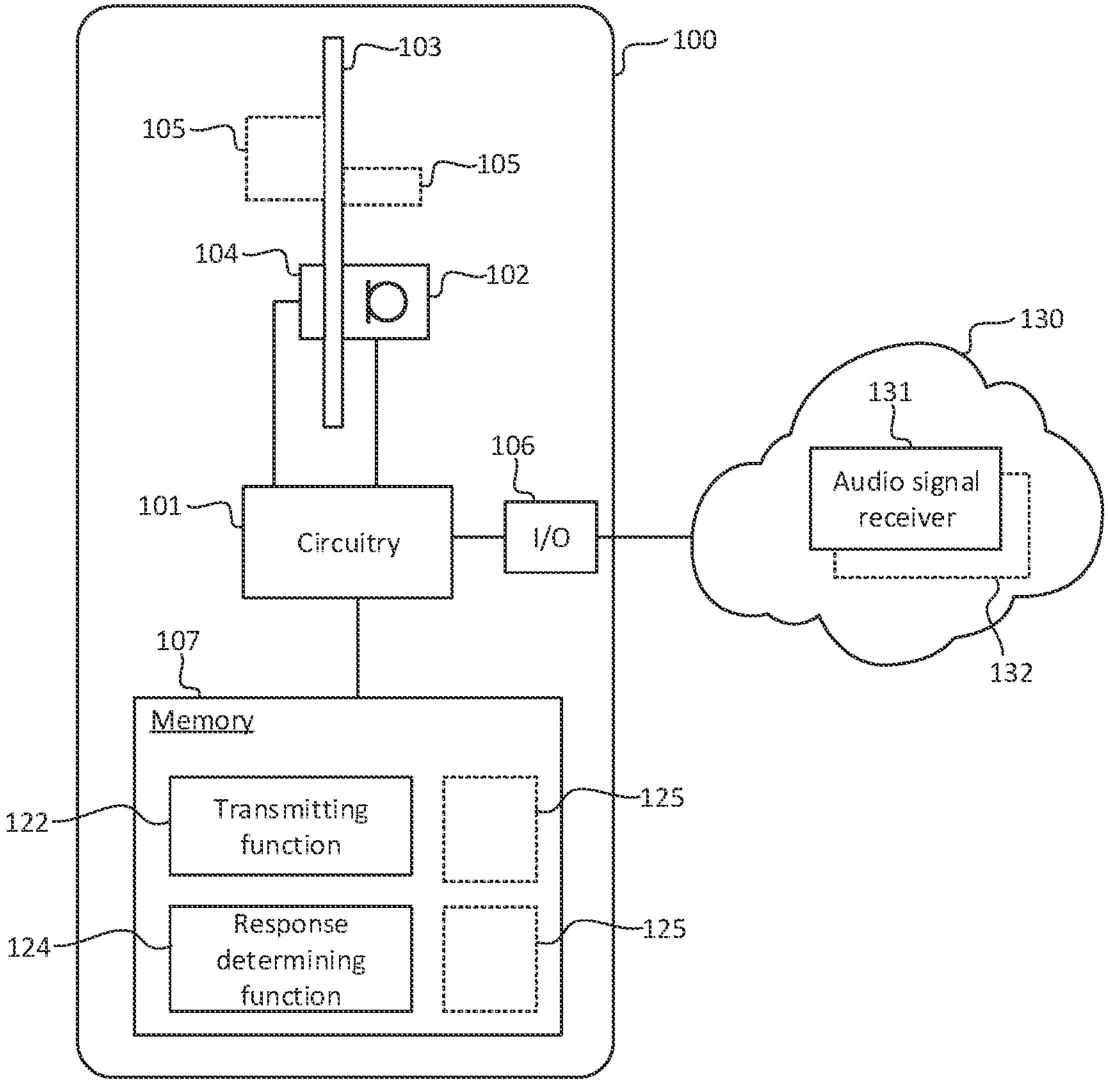
FIG. 1 schematically illustrates a device comprising a microphone.

Reference will now be made to FIG. 1, which schematically illustrates a device 100 and FIGS. 3*a-b* and FIGS. 4*a-b* that exemplify a respective impulse waveform 301 and a respective corresponding response signal 351.

The device 100 comprises circuitry 101, a microphone 102 and a piezoelectric component 104. The piezoelectric component 104 and the microphone 102 are located in a vicinity of each other and arranged in mechanical connection with each other. The circuitry 101 is connected to the microphone 102. The circuitry 101 is connected to the piezoelectric component 104. Further electronic components 105 are indicated as being part of the device 100. These further electronic components 105 may for example comprise circuits and other means, such as imaging circuitry and a lens system for realizing a surveillance camera.

Communication between the circuitry 101 of the device 100 and external entities is realized via input/output circuitry 106. For example, communication may be realized between the circuitry 101 and a network 130 in which an audio signal receiver 131 and other communicating entities 132 are interconnected. For example, the device 100 may be a network surveillance camera connected to the internet, i.e., network 130, operated by an operator or user computer system, i.e., entity 132, and wherein the audio signal receiver 131 forms part of such an operator or user computer system.

The circuitry 101 of the device 100 is configured to carry out overall control of functions and operations of the device 100. The circuitry 101 may include a processor, such as a central processing unit (CPU), microcontroller, or microprocessor. The processor is configured to execute program code stored in a memory 107 in order to carry out functions and operations of the device 100.

The memory 107 may be one or more of a buffer, a flash memory, a hard drive, a removable medium, a volatile memory, a non-volatile memory, a random access memory (RAM), or another suitable device. In a typical arrangement, the memory 107 may include a non-volatile memory for long term data storage and a volatile memory that functions as system memory for the circuitry 101. The memory 107 may exchange data with the circuitry 101 over a data bus. Accompanying control lines and an address bus between the memory 107 and the circuitry 101 also may be present.

Functions and operations of the device 100 may be embodied in the form of executable logic routines (e.g., lines of code, software programs, etc.) that are stored on a non-transitory computer readable medium (e.g., the memory 107) of the device 100 and are executed by the circuitry 101 (e.g., using the processor). Furthermore, the functions and operations of the device 100 may be a stand-alone software application or form a part of a software application that carries out additional tasks related to the device 100. The described functions and operations may be considered a method that the corresponding part of the device is configured to carry out. Also, while the described functions and operations may be implemented in software, such functionality may as well be carried out via dedicated hardware or firmware, or some combination of hardware, firmware and/or software.

The circuitry 101 is configured to execute a transmitting function 122. The transmitting function 122 is configured to transmit a predetermined impulse waveform 301 to the piezoelectric component 104 to induce a mechanical impulse in the piezoelectric component 104. Hence, the impulse inducing function 122 is configured to induce the piezoelectric component 104 to undergo a change in spatial extension or vibrate according to the received impulse waveform. The change in spatial extension or vibration may have characteristics that may vary based on the mechanical properties of the context wherein the piezoelectric component 104 and the microphone 102 are arranged.

Figure 3A:
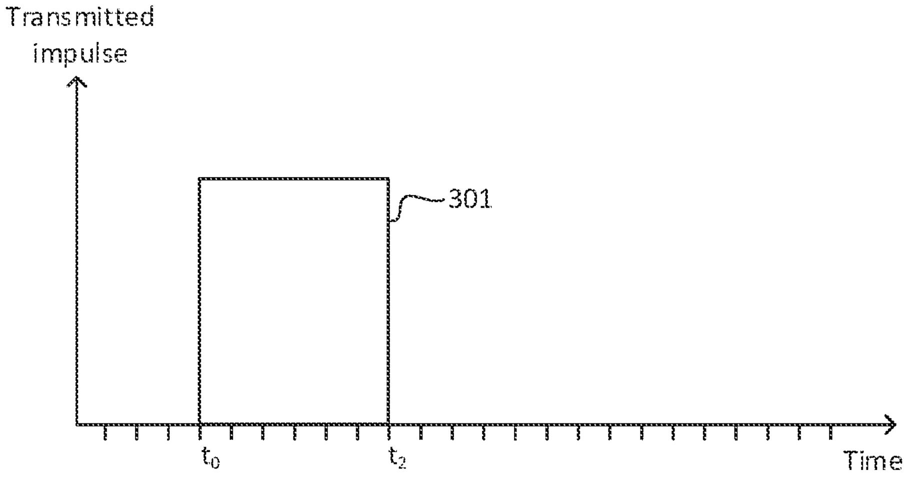
FIG. 3*a* schematically illustrates an impulse waveform.
Figure 3B:
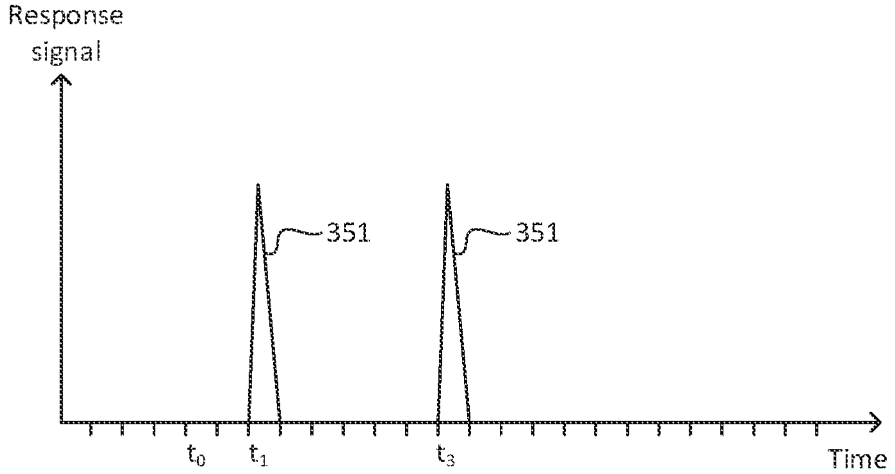
FIG. 3*b* schematically illustrates a response signal associated with the impulse waveform illustrated in FIG. 3*a*, FIG. 4*a* schematically illustrates an impulse waveform, and FIG. 4*b* schematically illustrates a response signal associated with the impulse waveform illustrated in FIG. 4*a*.

FIG. 3*a* illustrates an example where the predetermined impulse waveform 301 is in the form of a square wave having a leading edge at time t0 and a trailing edge at time t2. The piezoelectric component 104 reacts to the predetermined impulse waveform 301 in that it undergoes a change in spatial extension as a reaction to the leading edge and as a reaction to the trailing edge of the predetermined impulse waveform 301. The microphone 102 responds by creating the response signal waveform 351 that is schematically illustrated by a respective waveform peak at time t1 and at time t3. The points in time t1 and t3 are shifted in relation to the points in time t0 and t2 as a consequence of the mechanical and electronic characteristics of the components involved.

The circuitry 101 is further configured to execute a response determining function 124. The response determining function 124 is configured to determine whether the response signal waveform 351 from the microphone 102 corresponds to the predetermined impulse waveform 301. Upon the response signal waveform 351 from the microphone 102 corresponding to the predetermined impulse waveform 301, the response determining function 124 is configured to determine that the status of the microphone 102 is operational. For example, referring to FIGS. 3*a* and 3*b*, a positive correspondence may be determined in a case where a time difference t3−t1 is, within a reasonable error of margin, equal to a time difference t2−t0.

As exemplified in FIG. 1, the device may comprise a PCB 103 to which the microphone 102 and the piezoelectric component 104 are attached. It is noted that the microphone 102 and the piezoelectric component 104 are located in vicinity to each other. Preferably, the microphone 102 and the piezoelectric component 104 are both arranged on the PCB 103 such that they are in direct mechanical contact with each other. This enables efficient transfer of the induced mechanical impulse in the piezoelectric component 104 to the microphone 102. The microphone 102 comprises a housing, attached to the PCB 102, and a membrane arranged within the housing. The attachment between the microphone housing and the PCB 102 may for example be in the form of solder, glue or by means of appropriate mechanical attachment means. Transfer of the induced mechanical impulse takes place from the piezoelectric component 104, which has performed a spatial expansion followed by a spatial contraction as a response to the predetermined impulse waveform 301 from the transmitting function 122, via the PCB 102 to the housing of the microphone 102. A relative movement is thereby created between the membrane of the microphone 102 and the housing of the microphone 102, resulting in the response signal 351 from the microphone 102 being determined by the response determining function 124.

The piezoelectric component 104 may be a multi-layer ceramic capacitor (MLCC). However, other types of piezoelectric arrangements may be used. For example, a piezoelectric actuator made of, e.g., lead zirconate titanate (PZT).

Figure 2:
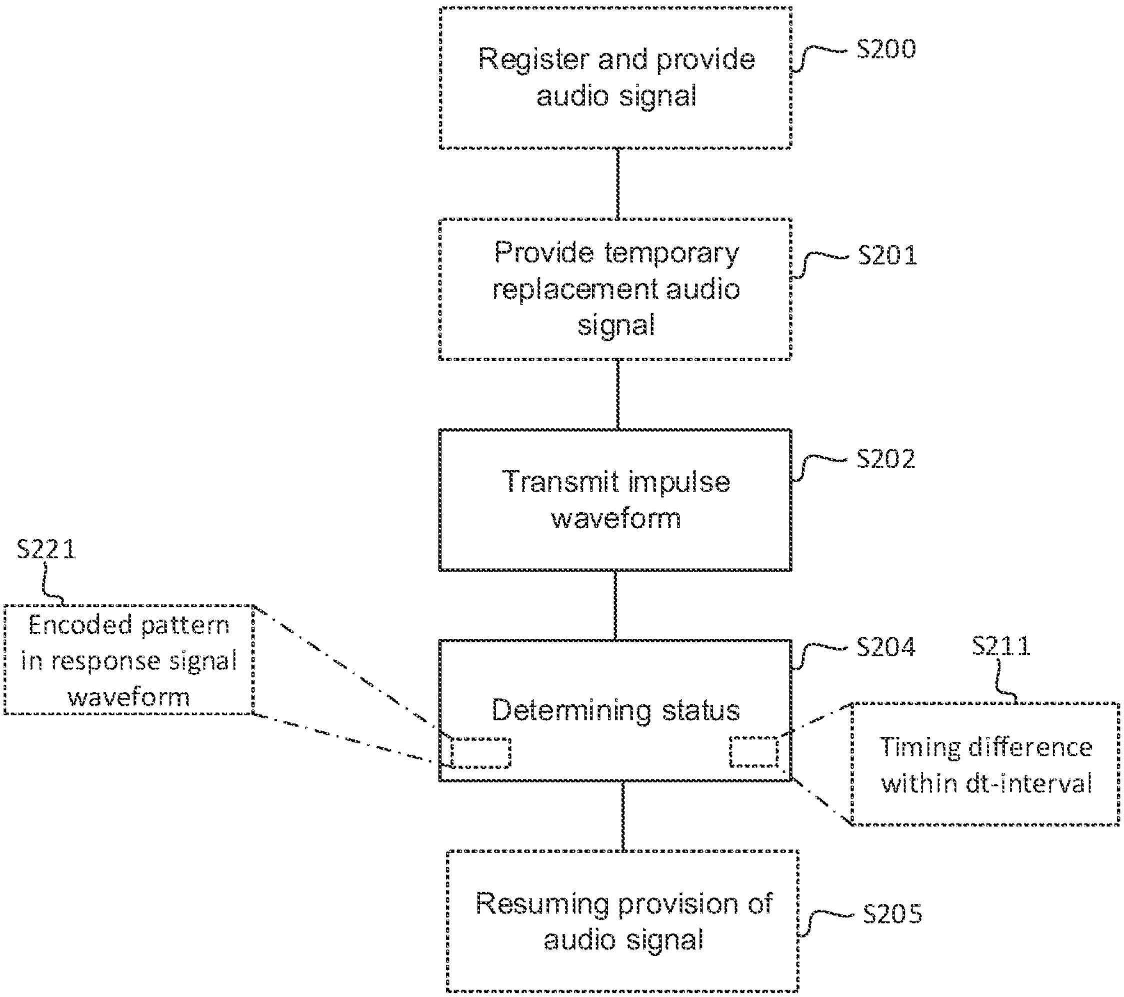
FIG. 2 is a flowchart of a method.

Turning now to FIG. 2, and with continued reference to FIG. 1, FIGS. 3*a-b* and FIGS. 4*a-b*, a method for determining a status of a microphone 102 will be described. Some or all the steps of the method may be performed by the device 100 described above. However, it is equally realized that some or all of the steps of the method may be performed by one or more other devices having similar functionality. The method is typically executed by the circuitry 101. However, it is to be appreciated that interaction may take place during execution with the operator or user computer system in the network 130 connected to the device 100 via the input/output circuitry 106. The method comprises the following steps. The steps may be performed in any suitable order.

A transmitting step S202 comprises transmitting a predetermined impulse waveform 301 to a piezoelectric component 104, the piezoelectric component 104 being located in a vicinity of the microphone 102 and arranged in mechanical connection with the microphone 102, to induce a mechanical impulse in the piezoelectric component 104.

A determining step S204 comprises determining whether a response signal waveform 351 from the microphone 102 corresponds to the predetermined impulse waveform 301, and upon the response signal waveform 351 from the microphone 102 corresponding to the predetermined impulse waveform 301, determining that the status of the microphone 102 is operational.

In the determining step S204, the determining whether a response signal waveform 351 from the microphone 102 corresponds to the predetermined impulse waveform 301 may comprise, in a determining step 211, determining that a timing difference between the response signal waveform 351 and the predetermined impulse waveform 301 is within a predetermined timing difference interval.

As FIG. 3*a* illustrates, and as discussed above in connection with FIG. 1, the predetermined impulse waveform 301 may be in the form of a square wave having a leading edge at time t0 and a trailing edge at time t2 and the response signal waveform 351 may comprise a respective waveform peak at time t1 and at time t3. As exemplified in connection with FIG. 1, a positive correspondence may be determined in a case where a time difference t3−t1 is, within a reasonable error of margin, equal to a time difference t2−t0. A positive correspondence may alternatively be determined in a case where a time difference t1−t0 and/or a time difference t3−t2 is within a reasonable error of margin.

In the determining step S204 and wherein the predetermined impulse waveform 301 comprises an encoded pattern 311, the determining whether a response signal waveform 351 from the microphone 102 corresponds to the predetermined impulse waveform 301 may comprise determining S221 that the response signal waveform 351 comprises the encoded pattern 311. For example, the encoded pattern 311 may be a sequence of a predetermined number of impulses delimited by a respective predetermined time interval 360.

Figure 4A:
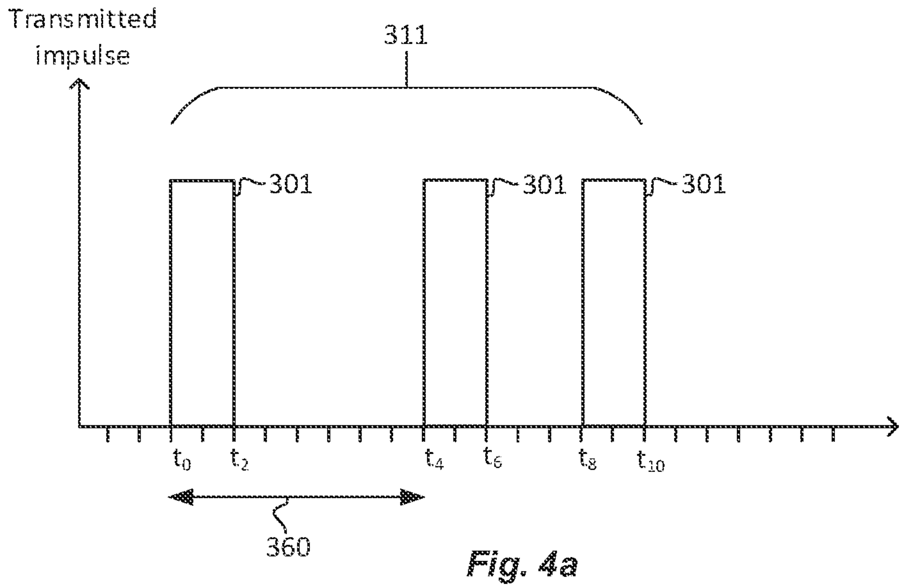
Figure 4B:
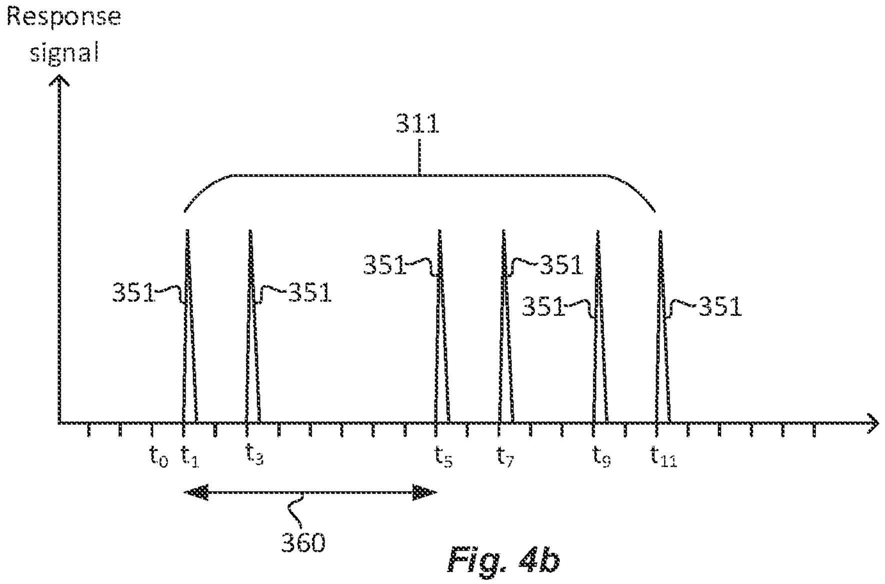

Such an example is schematically illustrated in FIGS. 4*a* and 4*b*. The predetermined impulse waveform 301 in FIG. 4*a* comprises three square waves having leading and trailing edges at times t0, t2, t4, t6, t8 and t10. The response signal waveform 351 is characterized by waveform peaks at times t1, t3, t5, t7, t9 and t11. An encoded pattern may then be defined by predetermined time intervals between the times of the leading edges at t0, t4 and t8. A positive determination that the response signal waveform 351 corresponds to the predetermined impulse waveform 301 may, e.g., then be when the time difference t5−t1 corresponds to t4−t0 and time difference t9−t5 corresponds to t8−t4.

As exemplified in FIGS. 3*a-b* and FIGS. 4*a-b*, the predetermined impulse waveform 301 may comprise a square waveform. However, other waveforms may be used, for example a more complex waveform may be used in order to optimize the electric/mechanical interaction within the piezoelectric component 104. In such examples, the response signal waveform 351 will also be more complex than the schematically exemplified waveform 351.

In some embodiments, the method comprises a registering step 200 during which registering of an audio signal from the microphone 102 takes place and the audio signal is provided to an audio signal receiver 131. In such embodiments, the method may comprise, prior to the step S202 of transmitting the predetermined impulse waveform 301 to the piezoelectric component 104, a step S201 of initiating provision of a temporary replacement audio signal. In these embodiments, the method also comprises, after the determining step S204 of determining whether a response signal waveform 351 from the microphone 102 corresponds to the predetermined impulse waveform 301, a resumption step S205 of resuming the provision of the audio signal to the audio signal receiver 131.

The temporary replacement audio signal may be a computed extrapolation or interpolation of the audio signal provided to the audio signal receiver 131 prior to the initiation of provision of the temporary replacement audio signal. Alternatively, the temporary replacement audio signal may be a difference audio signal computed by subtracting a predetermined response signal waveform from the response signal waveform 351 from the microphone 102.

In other words, the provision of the audio signal to the audio signal receiver 131 during the procedure of inducing the mechanical impulse in the piezoelectric component 104 is changed in that a replacement audio signal is provided instead. This means that the audio signal receiver 131, being an automated system or a human operator, is alleviated of any discomfort of hearing a noise that is characteristic of the reaction by the microphone 102 to the predetermined impulse waveform 301.

The person skilled in the art realizes that the present disclosure by no means is limited to the preferred embodiments described above. On the contrary, many modifications and variations are possible within the scope of the appended claims.

Additionally, variations to the disclosed embodiments can be understood and effected by the skilled person in practicing the claimed disclosure, from a study of the drawings, the disclosure, and the appended claims.

The invention claimed is:

1. A method for determining a status of a microphone, the method comprising:
- registering an audio signal from the microphone and providing the audio signal to an audio signal receiver;
- providing, while registering the audio signal from the microphone and while providing the audio signal to an audio signal receiver, a temporary replacement audio signal to the audio signal receiver;
- transmitting a predetermined impulse waveform to a piezoelectric component, the piezoelectric component being located in a vicinity of the microphone and arranged in mechanical connection with the microphone, to induce a mechanical impulse in the piezoelectric component;
- determining whether a response signal waveform from the microphone corresponds to the predetermined impulse waveform;
  - resuming the provision of the audio signal to the audio signal receiver, and
  - upon the response signal waveform from the microphone corresponding to the predetermined impulse waveform, determining that the status of the microphone is operational.

2. The method of claim 1, wherein determining whether a response signal waveform from the microphone corresponds to the predetermined impulse waveform comprises:
- determining that a timing difference between the response signal waveform and the predetermined impulse waveform is within a predetermined timing difference interval.

3. The method of claim 1, wherein the predetermined impulse waveform comprises an encoded pattern, and wherein determining whether a response signal waveform from the microphone corresponds to the predetermined impulse waveform comprises
- determining that the response signal waveform comprises the encoded pattern.

4. The method of claim 3, wherein the encoded pattern is a sequence of a predetermined number of impulses delimited by a respective predetermined time interval.

5. The method of claim 1, wherein the predetermined impulse waveform comprises a square waveform.

6. The method of claim 1, wherein the temporary replacement audio signal is a computed extrapolation or interpolation of the audio signal provided to the audio signal receiver prior to the initiation of provision of the temporary replacement audio signal.

7. The method of claim 1, wherein the temporary replacement audio signal is a difference audio signal computed by subtracting a predetermined response signal waveform from the response signal waveform from the microphone.

8. A non-transitory computer-readable storage medium having stored thereon instructions for implementing a method for determining a status of a microphone, when executed on a device having processing capabilities, the method comprising:
- registering an audio signal from the microphone and providing the audio signal to an audio signal receiver;
- providing, while registering the audio signal from the microphone and while providing the audio signal to an audio signal receiver, a temporary replacement audio signal to the audio signal receiver;
- transmitting a predetermined impulse waveform to a piezoelectric component, the piezoelectric component being located in a vicinity of the microphone and arranged in mechanical connection with the microphone, to induce a mechanical impulse in the piezoelectric component;
- determining whether a response signal waveform from the microphone corresponds to the predetermined impulse waveform;
- resuming the provision of the audio signal to the audio signal receiver, and
- upon the response signal waveform from the microphone corresponding to the predetermined impulse waveform, determining that the status of the microphone is operational.

9. A device comprising circuitry, a microphone and a piezoelectric component, the piezoelectric component and the microphone being located in a vicinity of and in mechanical connection with each other, the circuitry being connected to the microphone and connected to the piezoelectric component, where the circuitry is configured to execute:
- registering of an audio signal from the microphone and providing the audio signal to an audio signal receiver;
- provision, while registering the audio signal from the microphone and while providing the audio signal to an audio signal receiver, of a temporary replacement audio signal to the audio signal receiver;

a transmitting function configured to transmit a predetermined impulse waveform to the piezoelectric component to induce a mechanical impulse in the piezoelectric component;

a response determining function configured to determine whether a response signal waveform from the microphone corresponds to the predetermined impulse waveform;

resumption of the provision of the audio signal to the audio signal receiver, and upon the response signal waveform from the microphone corresponding to the predetermined impulse waveform, determine that the status of the microphone is operational.

10. The device of claim 9, where the piezoelectric component is any of a multi-layer ceramic capacitor, MLCC, and a piezoelectric actuator made of lead zirconate titanate PZT.

11. The device of claim 9, comprising a printed circuit board, PCB, and where the microphone and the piezoelectric component are both attached to the PCB in the vicinity of each other.

* * * * *